Sept. 27, 1966      A. R. HEDGES      3,275,387
VEHICLE SUSPENSION SYSTEM
Filed Aug. 13, 1964      3 Sheets-Sheet 1
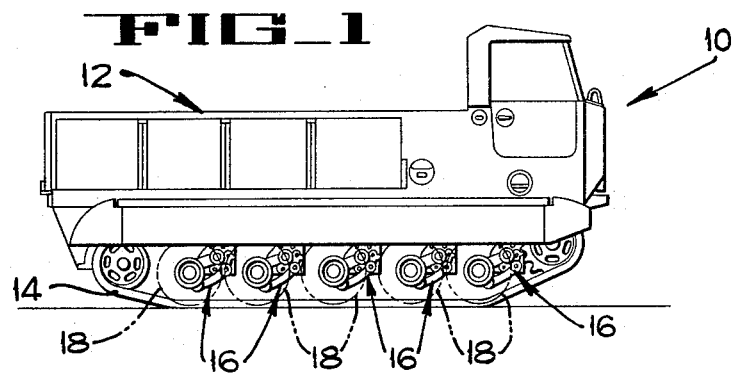
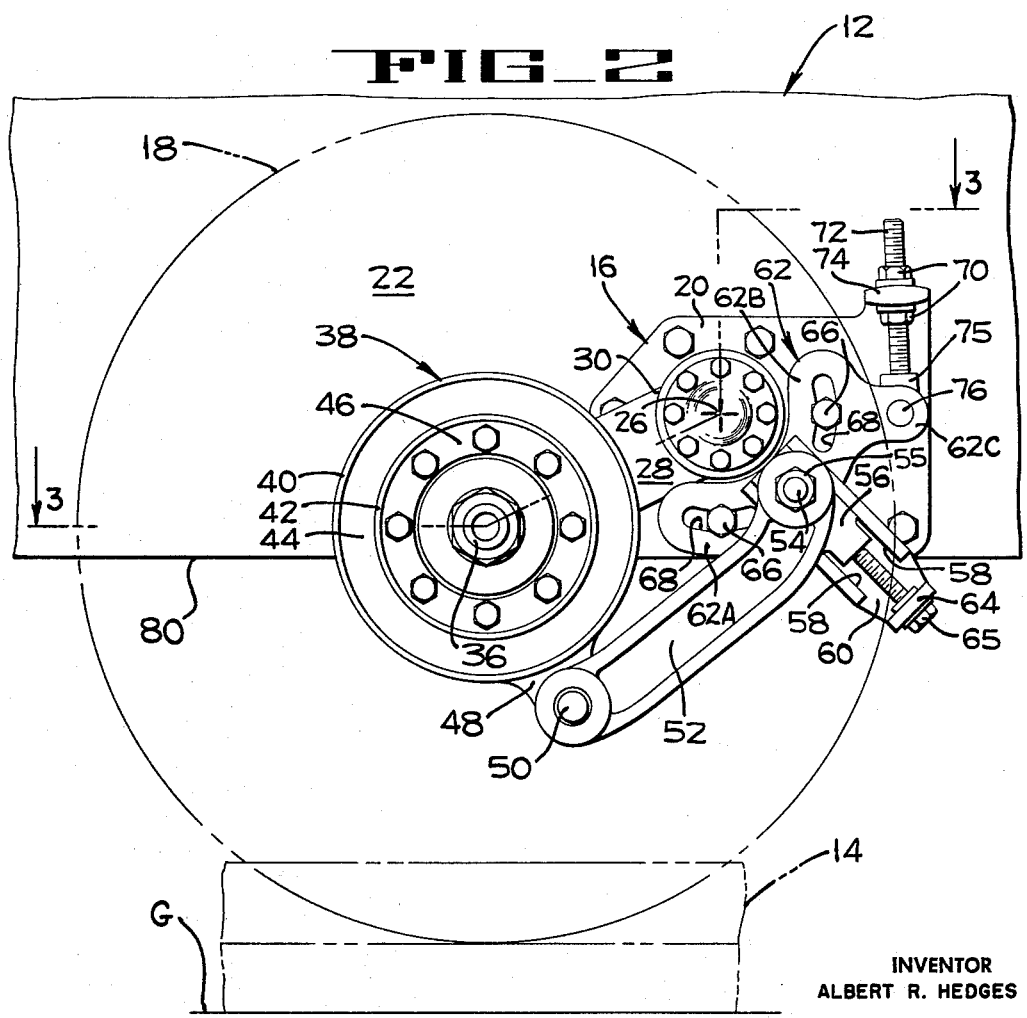
INVENTOR
ALBERT R. HEDGES
BY *Hans G. Hoffmeister*
ATTORNEY

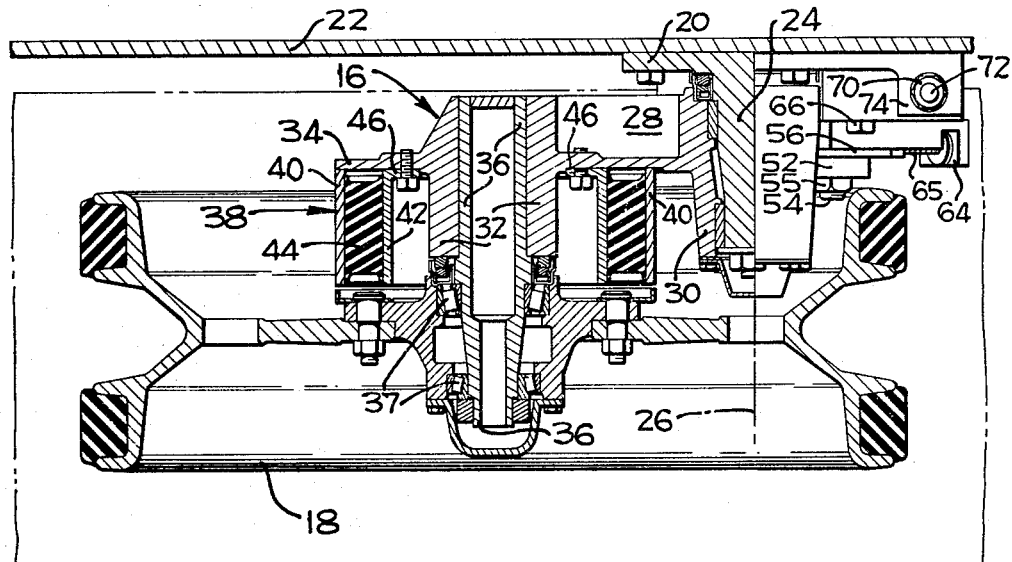
FIG_3
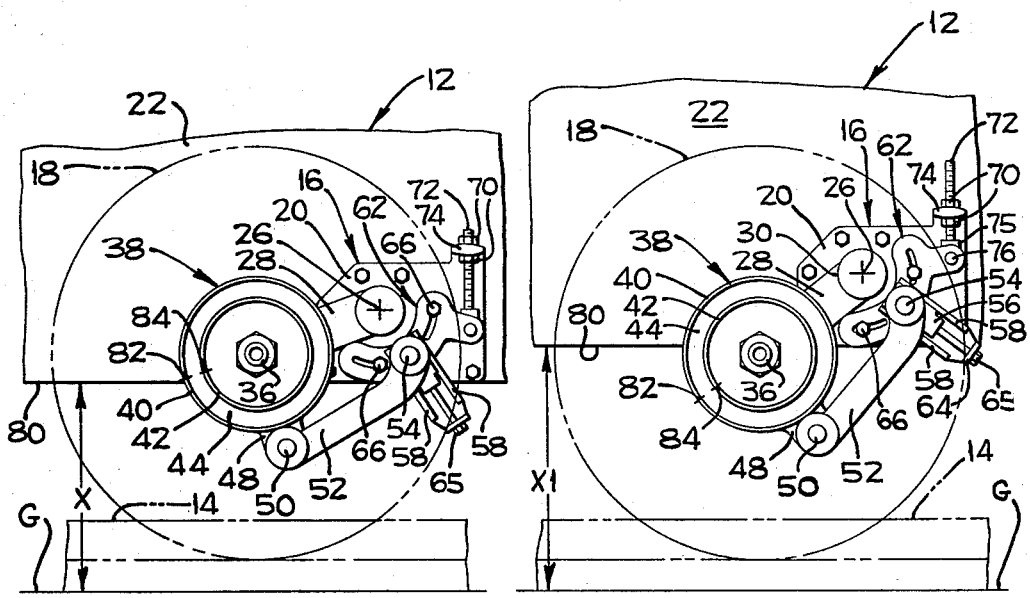
FIG_4    FIG_5
INVENTOR
ALBERT R. HEDGES
BY Hans G. Hoffmeister.
ATTORNEY Sept. 27, 1966  A. R. HEDGES  3,275,387
VEHICLE SUSPENSION SYSTEM
Filed Aug. 13, 1964  3 Sheets-Sheet 3
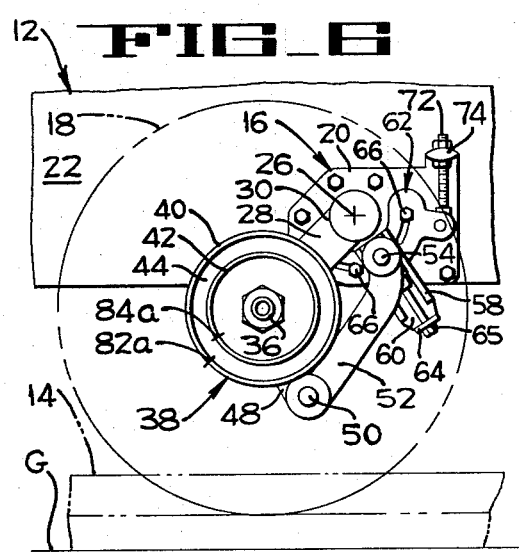
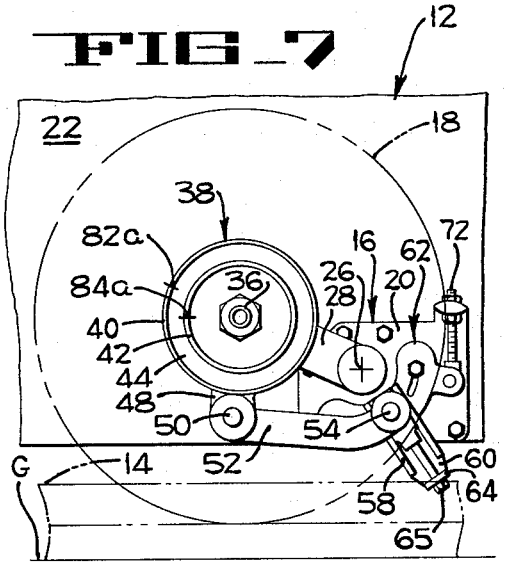
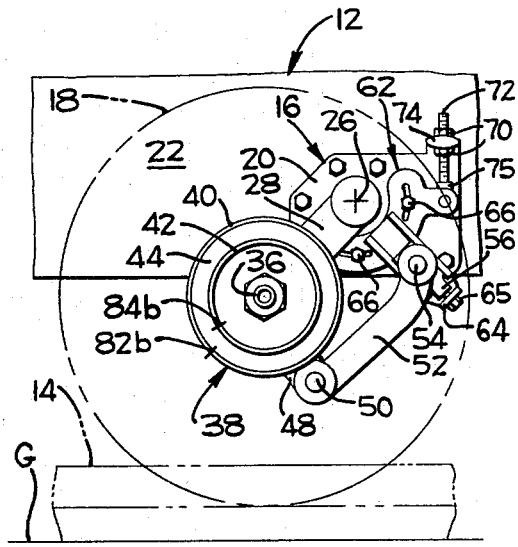
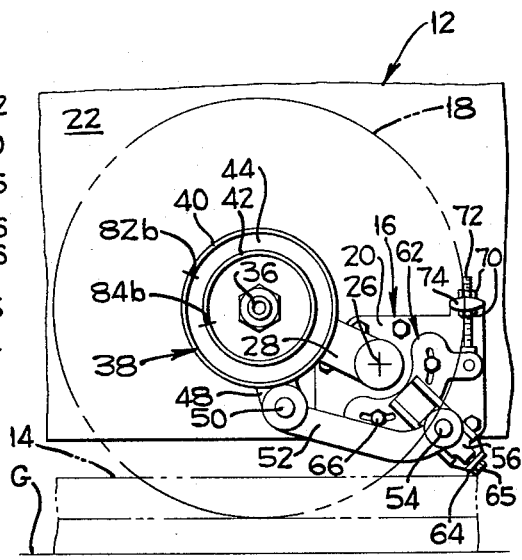
INVENTOR
ALBERT R. HEDGES
BY *Hans G. Hoffmeister*
ATTORNEY

United States Patent Office 3,275,387
Patented Sept. 27, 1966

3,275,387
VEHICLE SUSPENSION SYSTEM
Albert R. Hedges, Cupertino, Calif., assignor to FMC Corporation, San Jose, Calif., a corporation of Delaware
Filed Aug. 13, 1964, Ser. No. 389,342
12 Claims. (Cl. 305—27)

The present invention pertains to tracked vehicles, and more particularly relates to the suspension mechanism for the wheels, commonly known as bogie wheels, which support the body of a tracked vehicle and are in engagement with the lower flights of the tracks.

In tracked vehicles for military use, it is customary to incorporate a spring mechanism in the suspension mechanism and it has been found that it is advantageous if the spring rate of the resilient means, which is interposed between the bogie wheels and the body, can be changed so as to enable more efficient operation of the vehicle under various load conditions and over various types of terrain. It is also desirable to be able to adjust the clearance between the ground and the bottom of the vehicle body to compensate for normal spring sag, as well as to adapt the vehicle to the terrain and to different loads.

One well known type of torsion spring in a bogie wheel suspension comprises a rubber ring bonded to inner and outer metal drums whereby, when one drum rotates relative to the other drum, the rubber ring is twisted. Large vertical deflections of the bogie wheel in conventional large amount of twist to the rubber ring. This twisting, of course, produces a large shear force in the rubber ring; thus, radical movement of a bogie wheel will sometimes produce forces sufficient to shear parts of the rubber ring in two and destroy its original strength.

The present invention provides a torsion type of bogie wheel suspension wherein the shear forces in the spring are minimized, and wherein both the spring rate of the suspension and the ground clearance of the vehicle are adjustable.

An object of the present invention is to provide an improved bogie wheel suspension for a tracked vehicle.

Another object of this invention is to provide bogie wheel suspension means in which both the spring rate and the attitude of the bogie wheel relative to the body of the vehicle are adjustable.

Another object is to provide a torsion spring type bogie wheel suspension in which the ground clearance and spring rate are adjustable, and in which provision is made to minimize shear forces in the torsion spring.

Other objects and advantages of the present invention will become evident from the following description and the accompanying drawings, wherein:

FIGURE 1 is a schematic side elevation of a tracklaying vehicle incorporating the bogie wheel suspension of the present invention.

FIGURE 2 is is an enlarged schematic side elevation of one of the bogie wheel suspension units shown in FIGURE 1; the bogie wheel and its mounting hub have been removed.

FIGURE 3 is a section taken along lines 3—3 on FIGURE 2, and illustrates a bogie wheel mounted on the bogie wheel suspension unit.

FIGURES 4 to 9, inclusive, are diagrammatic elevations illustrating various adjusted and operational positions of the bogie wheel suspension.

A typical amphibious track-laying military vehicle 10 (FIG. 1) comprises an elongate body or hull 12 which lies between two driven endless tracks 14, one track being positioned at each side of the vehicle. When the vehicle is on land, the lower flights of the tracks 14 support the hull 12 by means including a plurality of bogie wheel suspension units 16. Each suspension unit 16 is provided with a freely rotatable bogie wheel 18 that is resiliently engaged with the upper surface of the lower flight of the associated track 14.

In accordance with the present invention, each bogie wheel suspension unit 16 (FIGS. 2 and 3) is provided with a heavy duty mounting plate 20 that is bolted to the side wall 22 of the vehicle hull. Integral with each mounting plate and projecting outwardly therefrom is a horizontal spindle 24, about the axis 26 of which the bogie wheel 18 swings during operation of the vehicle 10. A rearwardly extending wheel support arm 28 is provided with a hollow hub 30 on its forward end that is pivotally mounted on the spindle 24. The rear end of the support arm 28 is formed with a hollow hub 32 (FIG. 3) which extends outward from a circular flange 34. The hub 32 is provided with an outwardly projecting and nonrotatable tubular axle 36 on which the bogie wheel 18 is rotatably mounted by conventional bearing means 37.

The outer end portion of the hub 32 (FIG. 3) is encircled by a torsion spring 38 which comprises a cylindrical outer metal ring or drum 40, an inner and similar drum 42 of smaller diameter, and a rubber annulus 44 which occupies the annular space between the two drums and is bonded to both drums in the entire area of its inner and outer surfaces. In the usual and well known manner, the drums are force-transmitting elements whereby forces causing relative rotation of the inner and outer drums are resisted by the rubber annulus, and the resiliency of the annulus provides a rebound impetus that tends to restore the original orientation of the drums relative to each other, and to restore the original orientation of the bogie wheels relative to the hull 12.

The inner drum 42 (FIGS. 2 and 3) is provided with an inwardly extending flange 46 that is bolted to the circular flange 34 on the bogie wheel support arm 28. The outer drum 40 is provided with a downward projecting, integral lug 48 (FIG. 2) which is pivotally connected by a pivot stud 50 to the bifurcated end of a torque reaction link 52. The other end of the link 52 is pivotally mounted on a stud 54 and is held thereon by a nut 55. The stud 54 is secured to a guide block 56 that can be locked in a selected position, as will be later described, radially related to the pivot axis 26 of the wheel support arm 28.

It will be apparent that any vertical movement of the bogie wheel 18 causes the wheel support arm 28 to swing about its pivot axis 26 whereby the rotative position of the inner drum 42 is changed with reference to the hull 12. Such change is resisted by the rubber annulus 44 since the annulus is anchored to both the inner drum 42 and to the outer drum 40, and the outer drum is connected to the pivotally anchored torque reaction link 52. The rubber annulus is thus twisted by the relative rotation of the inner and outer drums 42 and 40, respectively, and the inherent resiliency of the annulus provides a spring force tending to counteract its proportionate part of the weight of the vehicle as well as any up or down deflection of the bogie wheel 18 such as might be caused if that section of the track 14 should run over some ground obstruction or drop into a hole.

It is obvious that the shear force developed in the rubber annulus 44 for a given deflection of the bogie wheel 18 will progressively increase according to the distance between the stud 54 and the pivot axis 26 because if the stud 54 where coaxial with the axis 26 there would be no shear force developed at all. Accordingly, in the present invention the pivot stud 54 carried by the guide block 56 (FIG. 2) is slidable toward and away from the pivot axis 26 by two ways 58 that receive the block 56 whereby the distance between the axis of the stud and the pivot axis 26 can be varied. The ways 58 are part of a forwardly extending leg portion 60 of a bracket 62 which is adjustably mounted against the outer surface of the mounting plate 20.

An apertured flange 64 of leg 60 rotatably mounts, in an axially fixed position, an adjusting bolt 65 that is threaded into the guide block 56. Bolts 66 are threaded into the mounting plate 20 and extend through slots 68 that are formed in flanges 62A and 62B of the bracket 62 on a radius of the pivot axis 26 so that the bracket can be positioned and locked at various angular locations uniformly spaced from the spindle 24.

Positioning of the bracket 62 is effected by adjusting two nuts 70 that are threaded on a rod 72 and respectively lie above and below a flange 74 of the mounting plate 20. The lower end portion of the rod 72 is secured to a pivot block 75 which is secured by a pivot shaft 76 to an ear 62C of the bracket 62.

FIGURES 4 and 5 illustrate the effect of rotating the bracket 62 on the mounting plate 20 to increase the distance between the bottom edge 80 of the hull 12, and the ground line G, without changing the spring force provided by the rubber annulus 44. Attention is directed to the two reference marks 82 and 84 on drums 40 and 42, respectively, which indicate the relative positions of the two drums when the immobilized vehicle is supporting a normal load.

In FIGURE 4 the bracket 62 is at the extremity of its clockwise movement relative to the pivot axis 26, and the ground clearance is at its minimum distance under normal load conditions. The ground clearance can be increased by loosening the bolts 66 (FIG. 4) and by turning the nuts 70 to elevate the rod 72 relative to the flange 74. The pivot stud 54 is thus angularly repositioned relative to the axis 26, and the torque reaction link 52 consequently causes the outer drum 40 to assume a different rotative position. Since the load conditions of the vehicle have not changed, the inner drum 42 will retain its same position relative to the outer drum 40, as is shown by the reference marks 82 and 84 in FIGURE 5, and the vehicle, accordingly, will be elevated during repositioning of the bracket 62 until the initial ground clearance dimension X (FIG. 4) has increased to some greater dimension X1 (FIG. 5).

The illustrated embodiment of the invention contemplates that the described ground clearance adjustment is carried out to suit the vehicle to particular load and operational conditions before it is placed in operation. It will be apparent, however, that the above described operation of increasing the ground clearance of the vehicle to clear obstacles can easily be effected by a power ram while the vehicle is in motion, with but slight modification of the illustrated structure.

FIGURES 6 and 7 particularly illustrate an important feature of the invention whereby the amount of twisting of the rubber annulus 44 due to load and road shock is minimized, a feature in great part due to the mounting of the torsion spring 38 coaxial with the axis of rotation of the wheel 18. In contrast to this, the usual annular torsion spring arrangement will cause an amount of twisting in its annular spring element about equal to the amount the wheel support arm in displaced. Thus, if the wheel support arm of the ordinary suspension means is moved 45 degrees, its associated annular spring element will be subjected to approximately 45 degrees of twisting.

In the present invention a 70 degree deflection of the wheel support arm from an unloaded to a loaded condition of the vehicle, or from a road shock causing the same 70 degree deflection, will cause only about 35 degrees of twisting of the rubber annulus 44, and other wheel deflections cause proportionately small amounts of twisting of the rubber annulus.

The wheel support arm 28 (FIG. 6) is disposed at an angle of approximately 45 degrees when the vehicle is empty and when the bracket 62 is in its extreme clockwise position. It will be noted that the bracket 62 is in the same position as is shown in FIGURE 4; the angular distance between the reference marks 82a and 84a (FIG. 6), accordingly, indicates that the rubber annulus 44 is subjected to only about 12 degrees of twisting when the vehicle carries the assumed normal load as in FIGURE 4.

With all conditions the same as shown in FIGURE 6 except that the vehicle is loaded beyond a normal load to its maximum capacity, the wheel suspension unit 16 will assume the position shown in FIGURE 7 wherein the wheel support arm 28 has been moved about 70 degrees from its FIGURE 6 position. The angular distance between the reference marks 82a and 84a is now approximately 23 degrees, thus indicating that a total of only about 35 degrees (23 degrees plus the previously mentioned 12 degrees) of twisting occurs in the rubber annulus 44 under maximum load conditions with the wheel suspension unit 16 in the adjusted position illustrated in FIGURE 6.

The preceding outline, of course, does not account for the very small initial twisting of the annulus 44 that is caused by the weight of the vehicle, but it will be evident that, in any event, the rubber annulus 44 is subjected to less than usual shear stress whereby its life is prolonged and the normal spring fatigue factor is more nearly optimum than with ordinary torsion spring arrangements.

It will be apparent, now, that corrections to equalize ground clearance among a series of the wheel suspension units 16, after normal spring fatigue does occur, are very easily effected in the varying amounts each unit may require by merely adjusting the rotative position of the bracket 62 relative to the mounting plate 20.

FIGURES 8 and 9 illustrate the effect of repositioning the pivot stud 54 radially outward from the pivot axis 26 of the wheel support arm 28 by turning the adjusting bolt 65 to reposition the block 56. The result of this repositioning is to change the spring rate or ratio of load to spring deflection, in a manner increasing the spring force necessary to be overcome to produce a given deflection of the wheel 18 toward the hull 12. Stated another way, repositioning the pivot stud as described will enable the vehicle to carry heavier loads and to withstand greater road shocks.

In FIGURE 8 the vehicle is empty, the bracket 62 has been pivotally relocated upward from its FIGURES 6 and 7 position, and the pivot stud 54 has been moved away from the axis 26. The angular distance between the reference marks 82b and 84b (FIG. 8) is again about 12 degrees, while the distance between the same marks 82b and 84b (FIG. 9) is about 44 degrees when the vehicle is overloaded to a point where the wheel support arm 28 has moved upward about 70 degrees. Thus, by adjusting the wheel suspension unit as described, the rubber annulus 44 is now subjected to increased twisting; the twisting amounts to about 56 degrees under an overload sufficiently heavy to cause the hull of the vehicle to drop to a position wherein the clearance is the same as shown in FIGURE 7. Conversely, if the same load assumed for the FIGURE 7 illustration were to be assumed for the FIGURE 9 position, the twisting of the rubber annulus 44 would be less and the ground clearance of the hull would be increased.

In summary, the bogie wheel suspension shown in FIGURE 5 illustrates the same normal load condition shown in FIGURE 4, but the bracket 62 has been relocated in counterclockwise direction. As a result, the ground clearance of the hull 12 has been increased over the clearance obtained with the FIGURE 4 conditions. In FIGURE 6 the suspension adjustments are the same as shown in FIGURE 4, but the vehicle is empty. Comparison of the reference marks 82, 84 and 82a, 84a shows that a normal load in the vehicle twists the rubber annulus 44 about 12 degrees. FIGURE 7, which shows the same suspension adjustment shown in FIGURES 4 and 6, illustrates that a maximum load or road shock which moves the wheel support arm 28 upward about 70 degrees from its former position will twist the rubber annulus 44 approximately 35 degrees, this being the sum of the angular distance between the reference marks 82a, 84a in FIGURE 6, plus the angular distance between the same reference marks in FIGURE 7.

The pivot stud 54 (FIG. 8) has been moved outward from the axis 26; otherwise, the bogie wheel suspension is positioned as shown in FIGURE 5. Comparison of the reference marks 82, 84 and 82b, 84b reveals that moving the pivot stud 54 has no effect upon the 12 degree twisting of the rubber annulus 44 demonstrated in FIGURES 4 and 6: a normal load in the vehicle with the bogie wheel suspension adjusted as shown in FIGURE 8 causes the same 12 degree twisting of the annulus 44.

In FIGURE 9 the bogie wheel suspension has the same adjustment shown in FIGURE 8. When the vehicle is overloaded to a point where its ground clearance is the same as shown in FIGURE 7, the rubber annulus 44 has been twisted about 56 degrees, i.e., the 12 degrees shown between the reference marks 82b and 84b in FIGURE 8, plus about 44 degrees shown between the same reference marks in FIGURE 9.

An important point to be again noted from the foregoing description is that the adjustments which change the ground clearance and spring rate are to some degree interrelated, depending upon the conditions assumed. Thus FIGURES 4 and 5 show the ground clearance adjustment, under normal load conditions, which is effected by repositioning the bracket 62. However, if the same normal load is assumed for the FIGURE 8 empty position, the ground clearance will be approximately the same as shown in FIGURE 5, but the spring rate is changed. It is, therefore, clear that changing either the radial distance or the angular distance of the stud 54 relative to the pivot axis 26 can affect both the spring rate and the hull clearance under various load conditions.

It is to be noted that either adjustment feature, the means for changing the radial distance of the stud 54 to the pivot axis 26, or the means for changing the angular distance between the stud and pivot axis, is useful without the other adjustment feature. Maximum utility of the invention is achieved when both adjustments are provided, however, because the range of each is enhanced by the other due to their interrelated actions if the load conditions are not constant each time the vehicle is used.

While a particular embodiment of the present invention has been shown and described, it will be understood that the disclosed bogie wheel suspension is capable of modification and variation without departing from the principles of the invention, and that the scope of the invention should be limited only by the scope and proper interpretation of the claims appended hereto.

The invention having thus been described, that which is believed to be new, and for which protection by Letters Patent is desired, is:

1. A vehicle suspension system, comprising a wheel support arm pivoted at one end to the body of the vehicle, a wheel supported by the free end portion of said wheel support arm, a drum type torsion spring having two resiliently interconnected force transmitting elements, means mounting said spring in substantially coaxial relation to the wheel and anchoring one of said elements to the free end of said support arm, torque reaction means pivoted to the other of said force transmitting elements and to the body of the vehicle, and means for radially adjusting the latter pivot point relative to the pivot point of said wheel support arm.

2. A torsion type spring suspension system for a bogie wheel of a tracked vehicle comprising a drum type torsion spring having two resiliently interconnected force transmitting elements, means rotatably supporting a bogie wheel in substantially coaxial relation to said torsion spring, means pivotally supporting said torsion spring and said wheel supporting means from a first pivot point on the body of the vehicle and preventing rotation of one of said force transmitting elements, torque reaction means pivoted to the other of said force transmitting elements and to another pivot point on the vehicle body and means for angularly adjusting the latter pivot point relative to said first pivot point.

3. A torsion type suspension system for the bogie wheels of a tracked vehicle comprising a wheel support arm pivoted to the body of the vehicle, bogie wheel support means mounted on said support arm adjacent the free end thereof, a torsion spring mounted on said wheel support arm adjacent the free end thereof and having one of its force transmitting elements anchored to said support arm, a torque reaction link having one end portion pivoted to the other force transmitting element of said torsion spring, means pivoting the other end portion of said torque reaction link to the vehicle body, and means for radially and angularly adjusting the latter pivot point relative to the pivot point of said wheel support arm to the vehicle body.

4. A torsion type spring suspension system for a vehicle wheel comprising a wheel support arm pivoted to the body of the vehicle, a wheel rotatably supported by the free end portion of said wheel support arm, a drum type torsion spring having two resiliently interconnected force transmitting elements, said torsion spring being mounted on said wheel support arm in substantially co-axial relation with the wheel and having one of said force transmitting elements secured to said support arm, a rigid torque reaction link having one end portion pivoted to the other of said force transmitting elements, and means defining an adjustable pivot axis on the vehicle body adjacent the pivot point of said wheel support arm to said body for the other end portion of said torque reaction link.

5. A torsion type spring suspension system for the bogie wheels of a tracked vehicle comprising a drum type torsion spring having two resiliently interconnected force transmitting elements, means defining a first pivot axis on the vehicle body, means pivotally supporting said torsion spring for vertical swinging movement about said first pivot axis and secured to one of said force transmitting elements, wheel support means substantially coaxial with said torsion spring and carried by said torsion spring supporting means, a wheel mounted for free rotation on said wheel support means and adapted to engage the track of the vehicle, a torque reaction link pivotally connected adjacent one end to the other of said force transmitting elements, means defining a second pivot axis on the vehicle body adjacent said first pivot axis and connected to the other end portion of said torque reaction link, and means for angularly and radially positioning said second pivot axis means relative to said first pivot axis means.

6. A torsion type suspension system for the bogie wheels of a tracked vehicle comprising a wheel support arm pivoted to the body of the vehicle for up and down swinging movement about a fixed pivot axis, bogie wheel support means mounted on said support arm adjacent the free end thereof, a torsion spring mounted on said wheel support arm adjacent the free end thereof and having one of its force transmitting elements anchored to said support arm, a torque reaction link having one end portion pivotally secured to the other force transmitting element of said torsion spring, and means adjustably pivoting the other end portion of said torque reaction link to the vehicle body for movement to a selected position radially related to said fixed pivot axis.

7. A torsion type suspension system for the bogie wheels of a tracked vehicle comprising a wheel support arm pivoted to the body of the vehicle for vertical movement about a fixed pivot axis, bogie wheel support means mounted on said support arm adjacent the free end thereof, a torsion spring mounted on said wheel support arm adjacent the free end thereof and having one of its force transmitting elements anchored to said support arm, a torque reaction link having one end portion pivoted to the other force transmitting element of said torsion spring, and means adjustably pivoting the other end portion of said torque reaction link to the vehicle body for movement to a selected position angularly related to said fixed pivot axis.

8. An idler wheel suspension for supporting the body of a tracked vehicle relative to the lower flights of its tracks comprising a wheel support arm pivoted adjacent one end to the body of the vehicle, wheel support means carried by the other end of said wheel support arm, an idler wheel rotatably mounted on said wheel support means and engaged with the associated track of the vehicle, a drum type torsion spring coaxially mounted with said wheel on said wheel support means and having two resiliently interconnected force transmitting elements, means anchoring one of said elements to said wheel support arm, and a rigid torque reaction link pivotally connecting the other of said elements to a point on the vehicle body adjacent said pivotal connection of said wheel support arm to said vehicle body.

9. An idler wheel suspension for supporting the body of a tracked vehicle relation to the lower flight of its tracks comprising a wheel support arm pivoted adjacent one end of the body of the vehicle, wheel support means carried by the other end of said support arm, an idler wheel rotatably mounted on said wheel support means and engaged with the associated track of the vehicle, a drum type torsion spring coaxially mounted with said wheel on said wheel support means and having two resiliently interconnected force transmitting elements, means anchoring one of said elements to said support arm, and torque reaction means pivotally connecting the other of said elements to a point on the vehicle body adjacent said pivotal connection of said support arm to the vehicle body.

10. A spring system for a vehicle wheel comprising a wheel support arm pivoted to the body of the vehicle, a wheel supported by the free end portion of said wheel support arm, a drum type torsion spring having two resiliently interconnected force transmitting elements, means mounting said spring in substantially coaxial relation to the wheel and anchoring one of said elements to the free end of said support arm, torque reaction means pivotally interconnecting the other of said force transmitting elements with the vehicle body, and means for changing the angular and radial relation between the pivot points of said wheel support arm and of said torque reaction means to the vehicle body.

11. A torsion type spring suspension system for a bogie wheel of a tracked vehicle comprising a drum type torsion spring having two resiliently interconnected force transmitting elements, means rotatably supporting a bogie wheel in substantially coaxial relation to said torsion spring, means pivotally supporting said torsion spring and said wheel supporting means from a first pivot point on the body of the vehicle body and preventing rotation of one of said force transmitting elements, torque reaction means pivotally connecting the other of said force transmitting elements to another pivot point on the vehicle body, and means for adjusting the angular and radial relation of one of said pivot points relative to the other of said pivot points.

12. A torsion type spring suspension system for the bogie wheels of a tracked vehicle comprising a drum type torsion spring having two resiliently interconnected force transmitting elements, means defining a first pivot axis on the body of the vehicle, means pivotally supporting said torsion spring for movement in a vertical plane about said first pivot axis and secured to one of said force transmitting elements, wheel support means substantially coaxial with said torsion spring and carried by said torsion spring supporting means, a wheel mounted for free rotation on said wheel support means and adapted to engage the associated track of the vehicle, a torque reaction link pivotally connected adjacent one end to the other of said force transmitting elements, means defining a second pivot axis on said vehicle body adjacent said first pivot axis and including a pivotal connection to the other end portion of said torque reaction link, and means for angularly and radially adjusting one of said pivot axis means relative to the other of said pivot axis means.

References Cited by the Examiner
UNITED STATES PATENTS

| 2,355,456 | 8/1944 | Macbeth | 267—57.1 |
| 2,403,362 | 7/1946 | Hait | 305—27 X |
| 2,436,681 | 2/1948 | Swenson | 267—57.1 |
| 3,013,808 | 12/1961 | Willetts | 267—57 X |

BENJAMIN HERSH, *Primary Examiner.*

R. J. JOHNSON, *Assistant Examiner.*

UNITED STATES PATENT OFFICE
CERTIFICATE OF CORRECTION

Patent No. 3,275,387                                        September 27, 1966

Albert R. Hedges

It is hereby certified that error appears in the above numbered patent requiring correction and that the said Letters Patent should read as corrected below.

Column 1, between lines 30 and 31, insert -- suspension systems, however, cause a correspondingly --; column 7, line 2, for "relation" read -- relative --; line 4, for "of", first occurrence, read -- to --.

Signed and sealed this 7th day of November 1967.

(SEAL)
Attest:

Edward M. Fletcher, Jr.                                 EDWARD J. BRENNER
Attesting Officer                                           Commissioner of Patents